United States Patent [19]
Fujita

[11] Patent Number: 5,994,863
[45] Date of Patent: Nov. 30, 1999

[54] NUMERICAL CONTROL UNIT

[75] Inventor: Jun Fujita, Mishima, Japan

[73] Assignee: Toshiba Kikai Kabushiki Kaisha, Tokyo, Japan

[21] Appl. No.: 09/038,839

[22] Filed: Mar. 12, 1998

[30] Foreign Application Priority Data

Mar. 13, 1997 [JP] Japan ................................ 9-059232

[51] Int. Cl.$^6$ ................................ G05B 19/41
[52] U.S. Cl. .................... 318/568.15; 318/573; 318/574; 364/474.29; 364/474.3; 364/474.31; 901/2
[58] Field of Search ................................ 318/569, 574, 318/560, 561, 567, 568.1–568.24; 364/474.28–474.33; 901/2, 3, 4, 5, 9, 10, 14–23

[56] References Cited

U.S. PATENT DOCUMENTS

| | | | |
|---|---|---|---|
| 5,028,855 | 7/1991 | Distler et al. | 364/474.29 |
| 5,140,236 | 8/1992 | Kawamura et al. | 318/568.1 |
| 5,227,978 | 7/1993 | Kato | 364/474.31 |
| 5,321,623 | 6/1994 | Ensenat et al. | 364/474.31 |
| 5,726,896 | 3/1998 | Jia et al. . | |

FOREIGN PATENT DOCUMENTS 8-305430  11/1996  Japan .

*Primary Examiner*—David Martin
*Attorney, Agent, or Firm*—Finnegan, Henderson, Farabow, Garrett & Dunner, L.L.P.

[57] ABSTRACT

An object of the present invention is to provide a numerical control unit which commands definition data of free curved line to directly interpolate a free curved line and also holds down various errors which occurs during the aforesaid process within each allowable value. In the present invention, a program 11 which defines a moving locus with a curved line P(t) represented by the given parameter t is decoded and working commands according to the moving locus are outputted to servo systems 12, 13, and 14 to be controlled. In the output, the curved line P(t) of moving locus is interpolated in a curved line interpolating section 16. In the interpolation, an allowable error Emax in working results and error factors ωo, M and K for reference in a data setting section 21, a radius of curvature R(t) of the curved line P(t) is calculated in a radius of curvature calculating section 22, and maximum feed allowable speed Fmax less than an allowable error is calculated from the radius of curvature and the error factors in an allowable speed calculating section 23. In a command speed limiting section 24, when the allowable speed Fmax is lower than command speed CF of working command, command speed in the curved line interpolating section 16 is limited to the allowable speed Fmax, thus preventing a error by excessive speed.

15 Claims, 2 Drawing Sheets

NUMERICAL CONTROL UNIT

BACKGROUND OF THE INVENTION

1. Field of the Invention

This invention relates to a numerical control unit which is applied to program control of machine tools or industrial robotic operations or the like.

2. Description of the Related Art

Conventionally, in machine tools or industrial robotic operations, a numerical control unit (NC unit) which decodes and executes a given command program to control the machine tools and the like is utilized.

Numerical Control Unit and Interpolating Operation

A numerical control unit reads in advance a command program in which working commands (position, speed and the like) are sequentially described in a specified format, and, outputs during actual working operations, each command to machine tools and the like at a predetermined time period to execute each specific working operation.

In a recent numerical control unit, in order to improve working accuracy, a command curved line is interpolated so as to make a locus smooth, and interpolation for a two-axes synchronous working operation and the like is performed.

In the above-described interpolation, the interpolating operation is executed by analyzing the command curved line in advance and then approximately reconstructing the analyzed command curved line as a combination of minute blocks of minute straight lines, arcs and the like.

Data Format in Numerical Control Unit

In generating the command program in the foregoing numerical control unit, when cutting work and the like is performed, shape data is sent from a computer aided design system (CAD system) and a command program is generated by utilizing the data (automatic programming) without separately programming.

A B-Spline curved line (Base-Spline) which can draw various curved lines freely is frequently employed for the data format used in the process from he aforesaid CAD design to the automatic generation of the command program. In addition, a NURBS curved line (Non-Uniform Rational B-Spline) which improves non-uniformity in the increase amount of knots of segments of B-Spline curved line has come to be frequently used.

Direct Interpolation in Free Curved Line

The above-described B-Spline curved line or NURBS curved line has a high expressive power in the command curved line so as to represent a freely curved line. On the other hand, the amount of data increases with the improvement of accuracy of a curved line, thereby causing the disadvantage of complicating the aforesaid interpolating operation.

To eliminate the disadvantage, an interpolating system in which an interpolating operation of NURBS curved line is efficiently performed is proposed (See Japanese Patent Laid-open No. Hei 8-305430 Bulletin).

In this system, data to specify a NURBS curved line are directly commanded to a numerical control unit. More concretely, the system is executed in the following order.

First, a command program is described and includes a interpolating command of NURBS curved line in which a command curved line is represented by a function P(t) of the specified parameter t as a variable. Movement per unit of time is calculated by a speed command of the interpolating command and a moving command is outputted. Next, the variation of parameter is calculated during movement based on the calculated moving amount. A value, which is derived after the variation is added to the present value, is substituted for the function of the NURBS curved line in order to obtain a coordinate value to be interpolated, and then the moving amount of each axis relative to the coordinate value is calculated.

Consequently, interpolation of a NURBS curved line can be directly commanded and executed, thereby avoiding complicating the above described interpolation processing operations.

Disadvantage in Prior Art

In the aforesaid direct interpolating system that employs the NURBS curved line, however, the amount of movement per one period in practical interpolation is defined by means of a feed speed commanded by a program so that a disadvantage described hereinafter occurs, and the elimination of the disadvantage has been desired.

Error Caused when the Free curved line Is Interpolated during Discrete-Time Periods In the case of a free curved line being interpolated during discrete timeperiods, a practically interpolated locus forms a continuity of minute straight lines when it is closely observed. An arc error Ec occurs between the straight line and the commanded line. The arc error Ec is shown by the following formula with a radius of curvature R (mm) in the concerning section of command curved line and with an angle of arc $\theta$ in a corresponding section.

$$E_c = R(1 - \cos(\theta)) \qquad \text{(Formula 1)}$$

Error Caused by a Delay of Servo

A servo section by a feedback loop is usually structured from a numerical control unit to an working section of a machine tool and the like. A radius reduction caused by the delay of the servo usually occurs when a curved line locus is drawn in the servo section. If the above-described error that is caused by a delay of the servo exceeds a maximum allowable error during actual working operation, then satisfactory working accuracy can not be obtained.

The error caused by a delay of servo (radius reduction dR (mm)) is shown in the following formula that represents the relationship between a servo loop position control gain $\omega_0$ (rad/sec), a radius of curvature R (mm), and a feed speed F (mm/min).

$$dR = \frac{1}{2R}\left(\frac{F}{60\omega_0}\right)^2 \qquad \text{(Formula 2)}$$

Error Caused By Mechanical Flexure Due to Centrifugal Force

When a curved line locus is drawn, a mechanical flexure occurs due to centrifugal force, thereby causing an error based on the feed speed and/or the mass of a moving section.

The maximum value of the error Em caused by mechanical flexure due to centrifugal force is expressed by the following formula representing the relationship between a radius of curvature R (mm) in the section of the command curved line, a feed speed F (mm/min), the maximum mass M (kg) of a moving object and the rigidity of feed shaft K (kgf/$\mu$m).

$$E_m = \frac{M\left(\frac{F}{60000}\right)^2}{9.8 \times 10^3 K \times R} \qquad \text{(Formula 3)}$$

An object of the present invention is to provide a numerical control unit which commands defining data of a free curved line so as to directly interpolate a free curved line and also substantially maintain various errors which occur during the aforesaid process within each allowable value.

SUMMARY OF THE INVENTION

The characteristic of the present invention is to provide a numerical control unit that decodes a program which defines a moving locus by a curved line P(t) represented by a given parameter t and that outputs a working command based on the moving locus to a predetermined object to be controlled. The numerical unit is provided with a curved line interpolating section which interpolates a curved line P(t) of the moving locus when the working command is outputted, an allowable error setting section which previously sets or stores a predetermined allowable error during the actual working operation, an error factor setting section which previously sets or stores error factors for reference, a radius of curvature calculating section which calculates a radius of curvature in the curved line P(t), an allowable speed calculating section which evaluates the radius of curvature and the error factors and calculates the maximum feed allowable speed that does not exceed the allowable error, and a command speed limiting section which controllably maintains a commanded speed output by the numerical control unit to below the maximum feed allowable speed when the command speed, which is based on the working command, exceeds the maximum feed allowable speed.

In the present invention, a basic direct interpolation in a free curved line is executed by means of a curved line interpolating section. In addition, in accordance with an allowable error and error factors which are previously set, the maximum feed allowable speed relative to a radius of curvature is calculated and a command speed generated as a result of an interpolation process performed by the curved line interpolating section, is controllably maintained below the given allowable speed which does not cause an error, thus preventing the foregoing various errors from occurring in direct interpolation.

In the present invention, error factors caused by a delay of servo are preferably set in the error factor setting section so that the allowable speed calculating section evaluates an error caused by a delay of servo as well as a basic arc error.

As a result, the unit can deal with an error caused by delay of servo in addition to an arc error.

A position control gain is available based on error factors caused by a delay of servo. More concretely, in the command speed limiting section, the maximum feed allowable speed relative to the arc error and the maximum feed allowable speed relative to the error caused by delay of servo are respectively calculated and the smaller one of the above two can be output as the final maximum feed allowable speed.

In the present invention, in the error factor setting section, error factors caused by mechanical flexure due to a centrifugal force are preferably set so that the allowable speed calculating section evaluates an error caused by mechanical flexure due to centrifugal force separately from a basic arc error.

As a result, the unit can deal with an error caused by mechanical flexure due to centrifugal force in addition to an arc error.

The mass of a moving object to be controlled and mechanical rigidity are available for the error factors by mechanical flexure by centrifugal force. More concretely, in the command speed limiting section, the maximum feed allowable speed relative to the arc error and the maximum feed allowable speed relative to the error caused by mechanical flexure due to centrifugal force are respectively calculated and the smaller one of the above two can be output as the final maximum feed allowable speed.

The unit can deal with the above three errors, that is, the arc error, the error caused by delay of servo and the error caused by mechanical flexure due to centrifugal force. It is also possible that the smallest one of the above three maximum feed allowable speeds calculated relative to each error is the final maximum feed allowable speed.

In the present invention, a curved line P(t) represented by the given parameter t is preferably a NURBS curved line format.

The NURBS curved line has high ability in describing free curved line and high efficiency, thereby improving effect by direct interpolation. Therefore, remarkable results can be obtained by preventing various errors through application of the present invention.

In the present invention, it is preferable that the allowable error is individually set according to the aforesaid program.

Consequently, each allowable error is set according to each processing program, that is, particular works to be processed and the like, thereby optimizing error compensation depending on particular works and the like.

In the present invention, the allowable error is preferably set as a common system parameter irrespective of the above-described program.

Hence, a basic allowable error can be assigned as a common setting in the system, which does not need to assign an allowable error in each processing program, thus omitting the complication of process and certainly securing the lowest accuracy and the like.

DETAILED DESCRIPTION OF THE PREFERRED EMBODIMENT(S)

A preferable embodiment of the present invention will now be described with reference to the drawings.

Figure 1:
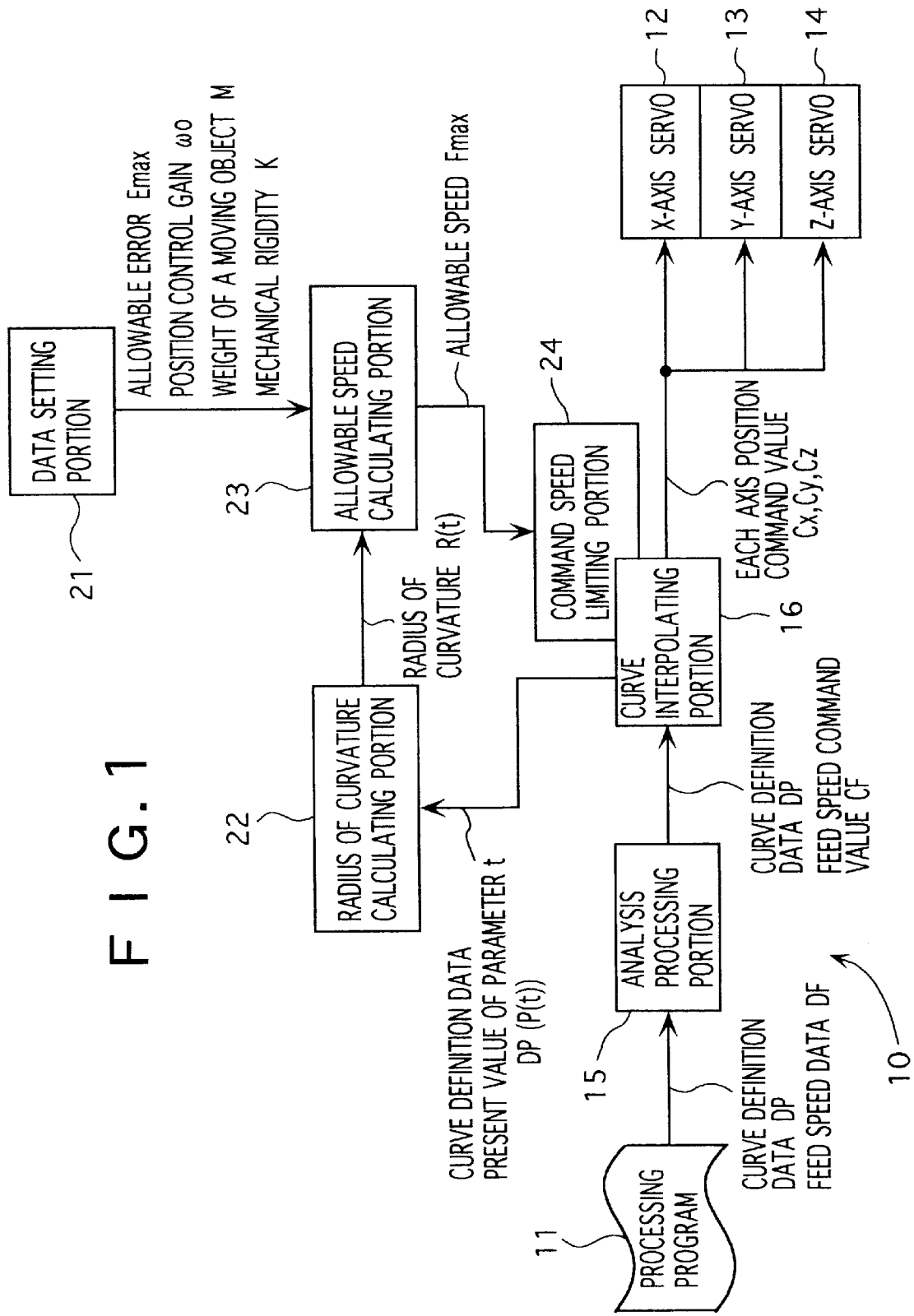
FIG. 1 is a block diagram showing an embodiment of the present invention.

In FIG. 1, a numerical control unit 10 reads a given processing program 11 and synchronously controls working of a plurality of axes composed of X-axis servo system 12, Y-axis servo system 13 and Z-axis servo system 14 in accordance with a working command described in the processing program.

Basic Structure of Numerical Control Unit

The numerical control unit 10 is basically composed of an analysis processing section 15 which reads, analyzes and processes the processing program 11 and a curved line interpolating section 16 which interpolates the analyzed result, and outputs command data obtained from the above-described processing to each working section, that is, a X-axis servo system 12, Y-axis servo system 13 and Z-axis servo system 14.

The processing program 11 defines a moving locus of data points with a curved line P(t) represented by the given parameter t, more concretely, defines a moving locus as NURBS curved line.

The analysis processing section 15 reads curved line definition data DP described in NURBS curved line and feed speed data DF, and sends the curved line definition data DP and feed command value CF to the curved line interpolating section 16.

The curved line interpolating section 16 executes direct interpolation of a free curved line with the sent curved line definition data DP and feed command value CF (See Japanese Patent Laid-open No. Hei 80305430 Bulletin) and calculates position command values Cx, Xy, and Cz of each of each of X-axis, Y-axis, and Z-axis, and outputs the values to the X-axis servo system 12, Y-axis servo system 13, and Z-axis servo system 14, respectively.

Thus far, the structure is the same as conventional art, but another structure according to the present invention is added to the curved line interpolating section 16.

New Structure according to the Present Invention

Structure added to the curved line interpolating section 16 are a data setting section 21, a radius of curvature calculating section 22, an allowable speed calculating section 23, and a command speed limiting section 24.

The data setting section 21 serves both as an allowable error setting section and an error factor setting section, where, in addition to an allowable error Emax in working results, position control gain CO o, the mass of a moving object M and mechanical rigidity K are also previously set and stored as error factors for reference.

The aforesaid setting can be done by means of a console panel of the numerical control unit 10, an external computer terminal unit or the like.

Each of the set values is properly stored in a storage section of the numerical control unit 10 as system parameter and also can be assigned in the processing program 11. In this case, the value can be read in the analysis processing section 15 and stored in the storage section of the numerical The radius of curvature calculating section 22 calculates a radius of curvature R(t) at the present position of a curved line P(t) by curved line definition data DP (which represents the curved line P(t)) sent to the curved line interpolating section 16 and the present value of parameter t of the curved line P(t). In the operation, the first stage differential P'(t) and the second stage differential P(t) of the present value are used to calculate with the following formula. In the following formula, X shows outer product operation.

$$R(t) = \left| \frac{(P'(t))^4}{(P'(t) \times P''(t)) \times P'(t)} \right| \quad \text{(Formula 4)}$$

The allowable speed calculating section 23 evaluates a radius of curvature R(t) obtained in the radius of curvature calculating section 22 and various values set in the data setting section 21 and calculates the maximum feed allowable speed Fmax. which does not exceed allowable errors Ex in regard to three ways of error factors.

Measures for Error Factor 1

An arc error Ec is considered as error factor I when a free curved line is interpolated with discrete-time and the corresponding allowable speed 5 Fmax. 1 is found.

Figure 2:
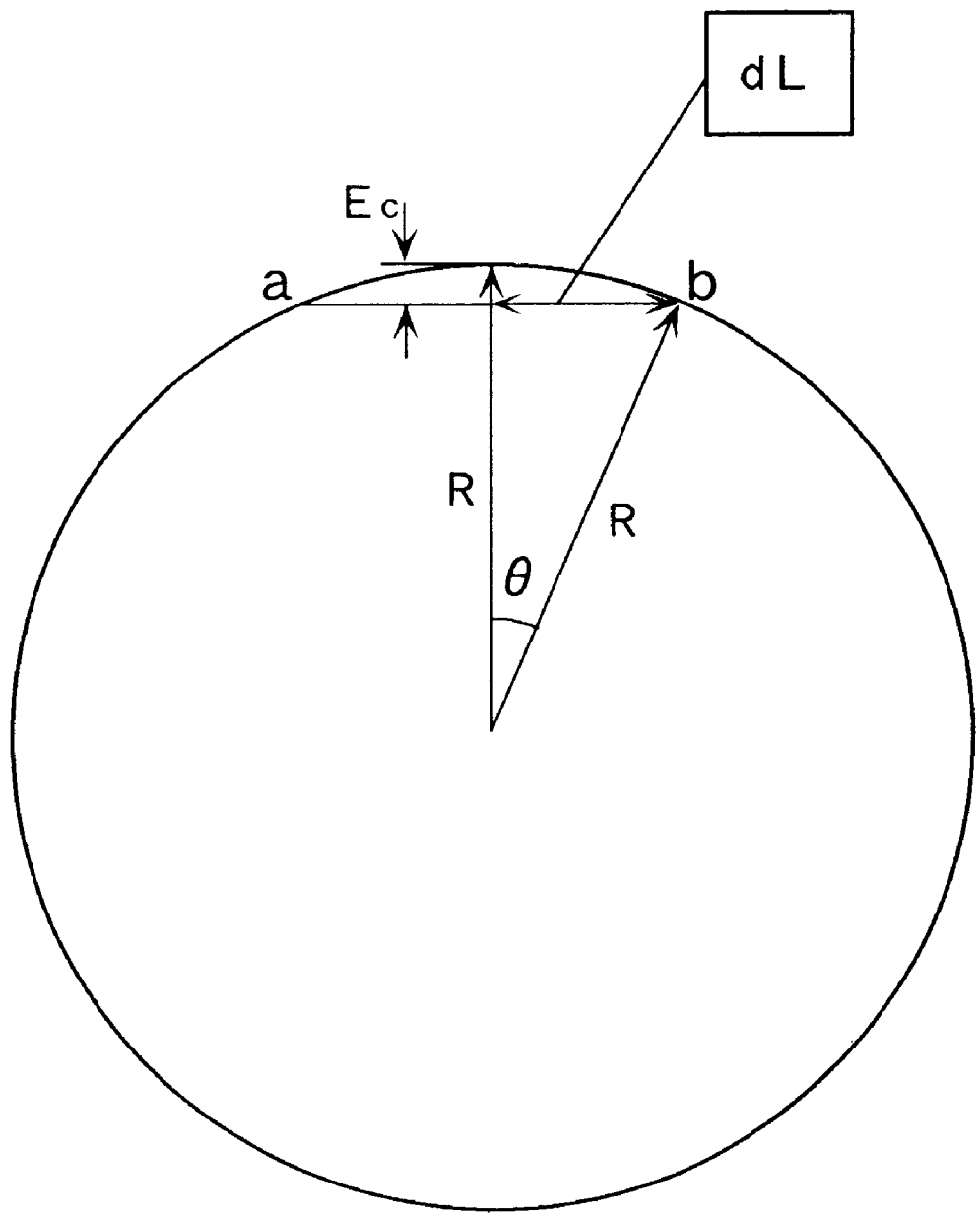
FIG. 2 is a schematic view showing a concept of operation according to an embodiment of the present invention.

An arc error Ec is found in the formula 1 as described above. The relation among an arc error Ec, a radius of curvature R, and an angle θ is shown in FIG. 2 so that the following formula is formed.

$$\sin(\theta) = \frac{dL}{2R} \quad \text{(Formula 5)}$$

The relation between dL and cos θ is shown in the following formula.

$$\cos(\theta) = \sqrt{1 - \sin^2(\theta)} \quad \text{(Formula 6)}$$
$$= \sqrt{1 - \left(\frac{dL}{2R}\right)^2}$$

Therefore, the above-described formula 1 is further transformed as follows.

$$E_c = R\left\{1 - \sqrt{1 - \left(\frac{dL}{2R}\right)^2}\right\} \quad \text{(Formula 7)}$$

$$\frac{E_c}{R} = 1 - \sqrt{1 - \left(\frac{dL}{2R}\right)^2}$$

$$\sqrt{1 - \left(\frac{dL}{2R}\right)^2} = 1 - \frac{E_c}{R}$$

$$1 - \left(\frac{dL}{2R}\right)^2 = 1 - 2\frac{E_c}{R} + \left(\frac{E_c}{R}\right)^2$$

$$\left(\frac{dL}{2R}\right)^2 = 2\frac{E_c}{R} + \left(\frac{E_c}{R}\right)^2$$

$$dL = 2R\sqrt{\frac{2E_c}{R} - \left(\frac{E_c}{R}\right)^2}$$

$$= 2\sqrt{2R \times E_c - E_c^2}$$

If the radius of curvature R(t), which is already derived, is substituted for R in the formula of dL obtained as derived above, the allowable moving amount of the position corresponding to the present parameter t is found. The allowable feed speed Fmax (mm/min), which is represented in minutes is multiplied by 60/T (i.e., T is a period of interpolation processing=time (sec)) so as to calculate the maximum feed allowable speed Fmax1 concerning the error factor 1.

Measures for Error Factor 2

An error caused by delay of servo is considered as error factor 2 and the corresponding allowable speed Fmax2 is found.

As described above, an error caused by delay of servo (radius reduction dR 0 (mm)) is represented in the aforesaid formula 2 representing the relationship between servo loop position control gain ωo (rad/sec), radius of curvature R (mm), and feed speed F (mm/min).

The position control gain ωo is set in the data setting section 21 and the radius of curvature R is already calculated as R(t). Hence, when the radius reduction dR in the aforesaid formula 2 is transformed as allowable error Emax, the following formula is derived.

$$dR = \frac{1}{2R}\left(\frac{F}{60\omega_0}\right)^2 = E\max \quad \text{(Formula 8)}$$

$$F = 60\omega_0 \sqrt{2R \times E\max}$$

From the speed F, the maximum feed allowable speed Fmax2 concerning the error factor 2 is calculated.

Measures for Error Factor 3

An error caused by mechanical flexure due to centrifugal force is considered as error factor 3 and the corresponding allowable speed Fmax3 is found. As described above, an error Em caused by mechanical flexure due to centrifugal force is shown in the foregoing formula 3 with radius of curvature R(mm) in the section concerned of command curved line, feed speed F (mm/min), the maximum mass M (kg) of a moving object and rigidity of feed shaft K (kgf/μm). The mass of a moving object M and mechanical rigidity of feed shaft K are set in the data setting section 21 and the radius of curvature R is already calculated as R(t). Therefore, when the error Ern in the formula 3 is transformed into allowable error Emax, the following formula is derived.

$$E_m = \frac{M\left(\frac{F}{60000}\right)^2}{9.8 \times 10^3 K \times R} = E\,max \qquad \text{(Formula 9)}$$

$$F = 60000\sqrt{\frac{9.8 \times 10^3 K \times R \times E\,max}{M}}$$

From the speed F, the maximum feed allowable speed Fmax3 concerning the error factor 3 is calculated.

The allowable speed calculating section 23 chooses the smallest one of the three allowable speeds Fmax1, Fmax2, and Fmax3 obtained in the above way as the final maximum allowable speed Fmax, and outputs Fmax to the command speed limiting section 24.

The command speed limiting section 24 compares the allowable peed Fmax sent from the allowable speed calculating section 23 with the feed speed command value CF sent to the curved line interpolating section 16. When the feed speed command value CF is smaller than the allowable speed Fmax, the command speed limiting section 24 delivers the feed speed command value CF as the actual feed speed to the curved line interpolating section 16 to perform interpolating operation. However, when the feed speed command value CF exceeds the allowable speed Fmax, the command speed limiting section 24 delivers the allowable speed Fmax as the actual feed speed to the curved line interpolating section 16 to perform interpolating operation so as to controllably maintain the feed speed within the allowable speed Fmax.

Consequently, during the interpolating operation of the curved line interpolating section 16, operations are always performed at feed speed below the allowable speed Fmax. Since the allowable speed Fmax is sufficient to avoid the above-described error factors 1 to 3, each error will not occur at below the maximum allowable value.

Effects of the Embodiment

According to the embodiment, a basic direct interpolation of a free curved line is performed in the curved line interpolating section 16. In addition, by means of the data setting section 21, the radius of curvature calculating section 22, the allowable speed calculating section 23, and the command speed limiting section 24, the maximum feed allowable speed is calculated depending on a radius of curvature in accordance with allowable errors and error factors which are previously set, and the command speed commanded to the curved line interpolating section is regulated below the given allowable speed which does not cause errors in direct interpolation. As a result, in direct interpolation, the occurrence of various errors such as arc error, error caused by delay of servo and error caused by centrifugal force is prevented.

Especially, the position control gain ωo corresponding to errors by delay of servo is set in the data setting section 21 as an error factor setting section, and the error caused by delays of servo is evaluated in the allowable speed calculating section 23, thus dealing with an error caused by delay of servo (error factor 2) in addition to an arc error (error factor 1).

The mass of a moving object M and the mechanical rigidity K corresponding to an error caused by mechanical flexure due to centrifugal force are set in the data setting section 21 as an error factor setting section and the error caused by centrifugal force is evaluated in the allowable speed calculating section 23, thus dealing with an error caused by mechanical flexure due to centrifugal force (error factor 3) in addition to an arc error (error factor 1) and an error caused by delay of servo (error factor 2).

In the present embodiment, a moving locus set in the processing program 11 is a curved line P(t) represented by the given parameter t. The curved line P(t) drawn in a NURBS curved line format has high efficiency, thereby improving effects by direct interpolation in addition to outstanding characteristics of NURBS curved line (high capability of describing free curved line), whereby the effects of preventing various errors by application of the present invention becomes remarkable.

In the present embodiment, allowable errors, the data of various error factors or the like are set as system parameter from the data setting section 21. Hence, a basic allowable error can be assigned as a common setting in the system, in which assignment of an allowable error in each processing program is not necessary, thus omitting the complication of process and certainly securing the lowest accuracy.

Modifications

It is to be noted that the present invention is not limited to the above-described embodiment. Instead, various modifications shown hereinafter are also included in the scope of the present invention.

In the above-described embodiment, allowable errors, data of various error factors or the like are set as a system parameter in the data setting section 21. However, the allowable errors, the data of various error factors or the like can be set each time by means of the processing program 11.

Thus, each allowable error can be set according to each processing program, that is, each particular work to be processed and the like, thereby performing optimizing error compensation depending on particular works and the like.

In the aforesaid embodiment, the data setting section 21 and the allowable speed calculating section 23 correspond to three error factors 1 to 3, but corresponding to all of the three error factors 1 to 3 is not indispensable to the present invention.

For example, when a moving section is light enough to exclude the possibility of error caused by centrifugal force, it is possible to take measures only for an arc error (error factor 1) and an error caused by delay of servo (error factor 2).

Moreover, when other error factors are assumed, it is only enough, needless to say, to settle errors including the new error factors.

In the above-described embodiment, the allowable speed Fmax is calculated as a unit of speed mm/min and the process in the curved line interpolating section 16 is limited below the allowable limit. However, an allowable speed can be converted to the value of amount of movement at every sampling period T (allowable speed X sampling period T) and a command value based on or in accordance with the processing program 11 is also converted to the same value and thereafter comparison and limitation can be performed.

What is claimed is:

1. A numerical control unit for decoding a program that defines a moving locus relative to a curved line P(t) represented by a given parameter t, and for outputting a working command based on the moving locus to a predetermined object to be controlled while the object moves and during an actual working operation, said numerical control unit comprising:

a curved line interpolating section for interpolating a curved line P(t) of the moving locus when the working command is outputted;

an allowable error setting section for storing a predetermined allowable error during the actual working operation;

an error factor setting section for storing predetermined error factors;

a radius of curvature calculating section for calculating a radius of curvature in the curved line P(t);

an allowable speed calculating section for evaluating the radius of curvature calculated by the radius of curvature calculating section, for evaluating the error factors stored in the error factor setting section, and for calculating a maximum feed allowable speed that does not exceed the allowable error; and a command speed limiting section for controllably maintaining a commanded speed outputted by the numerical control unit below the maximum feed allowable speed, which is calculated by the allowable speed calculating section, when the command speed, which is based on the working command, exceeds the maximum feed allowable speed.

2. The numerical control unit according to claim 1, wherein error factors caused by a delay of servo are stored in said error factor setting section, and wherein said allowable speed calculating section evaluates an error caused by a delay of servo separately from a basic arc error.

3. The numerical control unit according to claim 2, wherein the error factors caused by a delay of servo is a position control gain.

4. The numerical control unit according to claim 3, wherein said command speed limiting section calculates the maximum feed allowable speed relative to the arc error and the maximum feed allowable speed relative to the error caused by delay of servo, respectively, and outputs the smaller one of the above two speeds as the final maximum feed allowable speed.

5. The numerical control unit according to claim 1, wherein error factors caused by mechanical flexure due to centrifugal force are set in said error factor setting section, and wherein said allowable speed calculating section evaluates an error cause by mechanical flexure due to centrifugal force separately from a basic arc error.

6. The numerical control unit according to claim 5, wherein the error factors cause by mechanical flexure due to centrifugal force represent a mass of a moving object to be controlled and mechanical rigidity.

7. The numerical control unit according to claim 6, wherein said command speed limiting section calculates the maximum feed allowable speed relative to the arc error and the maximum feed allowable speed relative to the error caused by mechanical flexure due to centrifugal forces respectively and outputs the smaller one of the above two as the final maximum feed allowable speed.

8. The numerical control unit according to claim 1, wherein error factors caused by delay of servo and error factors caused by mechanical flexure due to centrifugal force are stored in said error factor setting section, and wherein said allowable speed calculating section evaluates an error caused by delay of servo and an error caused by mechanical flexure due to centrifugal force, respectively, separately from a basic arc error.

9. The numerical control unit according to claim 8, wherein the error factors caused by delay of servo is a position control gain, and wherein the error factors caused by mechanical flexure due to centrifugal force represent a mass of a moving object to be controlled and mechanical rigidity.

10. The numerical control unit according to claim 9, wherein said command speed limiting section calculates the maximum feed allowable speed relative to the arc error, the maximum feed allowable speed relative to the error by delay of servo and the maximum feed allowable speed relative to the error by mechanical flexure by centrifugal force respectively, and outputs the smallest one of the above three speed as the final maximum feed allowable speed.

11. The numerical unit according to claim 1, wherein the curved line P(t) is represented by the given parameter t of a NURBS curved line format.

12. The numerical unit according to claim 1, wherein the curved line P(t) is represented by the given parameter t that is described as curved line definition data in the program and feed speed data representing a feed speed of the object to be controlled while moving along a locus of the curved line P(t) are described in the processing program.

13. The numerical control unit according to claim 12, further comprising an analysis processing station which reads curved line definition data and feed speed data from the program, calculates a feed speed command value, and sends the feed speed command value with the curved line definition data to said curved line interpolating section.

14. The numerical control unit according to claim 1, wherein said allowable error setting section and said error factor setting section are integrally provided within a data setting section.

15. The numerical control unit according to claim 1, wherein the allowable error is individually stored according to the program.

* * * * *

UNITED STATES PATENT AND TRADEMARK OFFICE
CERTIFICATE OF CORRECTION

PATENT NO. : 5,994,863
DATED : November 30, 1999
INVENTOR(S) : Jun Fujita

It is certified that error appears in the above-identified patent and that said Letters Patent is hereby corrected as shown below:

Column 10,
Line 49, below the last line of claim 15, "to the program.", insert the following: -- 16. The numerical control unit according to claim 1, wherein the allowable error is set as a common system parameter irrespective of the program. --

Signed and Sealed this

Eighteenth Day of September, 2001

Attest:

*Attesting Officer*

NICHOLAS P. GODICI
*Acting Director of the United States Patent and Trademark Office*